US007302087B2

(12) United States Patent
Cho

(10) Patent No.: US 7,302,087 B2
(45) Date of Patent: Nov. 27, 2007

(54) DAUBECHIES WAVELET TRANSFORM OF IRIS IMAGE DATA FOR USE WITH IRIS RECOGNITION SYSTEM

(75) Inventor: Seong-Won Cho, Seoul (KR)

(73) Assignee: Senga Advisors, LLC, Boston, MA (US)

( * ) Notice: Subject to any disclaimer, the term of this patent is extended or adjusted under 35 U.S.C. 154(b) by 399 days.

(21) Appl. No.: 10/656,885

(22) Filed: Sep. 5, 2003

(65) Prior Publication Data

US 2004/0114781 A1 Jun. 17, 2004

Related U.S. Application Data

(63) Continuation of application No. PCT/KR01/01303, filed on Jul. 31, 2001.

(30) Foreign Application Priority Data

Mar. 6, 2001 (KR) ............................... 2001-11440

(51) Int. Cl.
*G06K 9/00* (2006.01)
(52) U.S. Cl. ...................................... 382/118; 382/117
(58) Field of Classification Search ................ 382/117, 382/118
See application file for complete search history.

(56) References Cited

U.S. PATENT DOCUMENTS 5,291,560 A * 3/1994 Daugman ................... 382/117

FOREIGN PATENT DOCUMENTS

EP 0 664 037 B1 12/2001

OTHER PUBLICATIONS

Daubechies, Ingrid; Antonini, Marc; Barlaud, Michel; Mathieu, Pierre; Image Coding Using Wavelet Transform; Apr. 1992; IEEE; vol. 1, No. 2; p. 205-220.*
Boles, et al., "A Human Identification Technique Using Images of the Iris and Wavelet Transform", IEEE transactions on Signal Processing, vol. 46, No. 4, pp. 1185-1188, Apr. 1998.
Boles, "A Security System Based on Human Iris Identification Using Wavelet Transform", 1997 First International Conference on Knowledge Based Intelligent Electronic Systems, pp. 533-541, May 21-23, 1997.
Boles, "A Wavelet Transform Based Technique for the Recognition of the Human Iris", ISSPA (International Symposium on Signal Processing and its applications) Gold Coast, Australia, pp. 601-604, Aug. 25-30, 1996.

* cited by examiner

*Primary Examiner*—Bhavesh M Mehta
*Assistant Examiner*—Jonathan Schaffer
(74) *Attorney, Agent, or Firm*—Knobbe Martens Olson & Bear, LLP

(57) ABSTRACT

The Present invention relates to a method of recognizing the human iris corresponding to a field of a biometric technology, and more particularly to a method of recognizing human iris using Daubechies wavelet transform, wherein the dimensions of characteristic vectors are reduced by extracting iris features from inputted iris image signals through the Daubechies wavelet transform, binary characteristic vectors are generated by applying quantiztion functions to the extracted characteristic values so that utility of human iris recognition can be improved since storage capacity arid processing time thereof can be improved since storage capacity characteristic vectors, and a measurement process suitable for the low capacity characteristic vectors is employed when measuring vectors and previously registered characteristic vectors.

20 Claims, 7 Drawing Sheets

(a)

(b)

DAUBECHIES WAVELET TRANSFORM OF IRIS IMAGE DATA FOR USE WITH IRIS RECOGNITION SYSTEM

RELATED APPLICATIONS

This application is a continuing application under 35 U.S.C. § 365 (c) claiming the benefit of the filing date of PCT Application No. PCT/KR01/01303 designating the United States, filed Jul. 31, 2001. The PCT Application was published in English as WO 02/071317 A1 on Sep. 12, 2002, and claims the benefit of the earlier filing date of Korean Patent Application No. 2001/11440, filed Mar. 6, 2001. The contents of the Korean Patent Application No. 2001/11440 and the international application No. PCT/KR01/01303 including the publication WO 02/071317 A1 are incorporated herein by reference in their entirety.

FIELD OF INVENTION

The present invention relates to a method of recognizing the human iris using Daubechies wavelet transform. More particularly, the present invention is directed to a method of recognizing human iris using Daubechies wavelet transform, wherein the dimensions of characteristic vectors are reduced by extracting iris features from inputted iris image signals through the Daubechies wavelet transform, binary characteristic vectors are generated by applying quantiztion functions to the extracted characteristic values so that utility of human iris recognition can be improved since storage capacity and processing time thereof can be reduced by generating low capacity characteristic vectors, and a measurement process suitable for the low capacity characteristic vectors is employed when measuring the similarity between the generated characteristic vectors and previously registered characteristic vectors.

BACKGROUND OF INVENTION

An iris recognition system is an apparatus for performing identification of each individual by differentiating iris patterns of the pupil of an eye, which are unique for each individual. It has superior identification accuracy and excellent security as compared with other biometric method using voice and fingerprints from each individual. A human iris is the region between a pupil and a white sclera of an eye, and iris recognition is a technique for performing identification of each individual based on information that is obtained from an analysis of the iris patterns which are different in each individual.

In general, it is a core technology to efficiently acquire unique characteristic information from input images in the field of an applied technology for performing identification of each individual by utilizing the characteristic information of the human body. A wavelet transform is used to extract characteristics of the iris images, and it is a kind of technique of analyzing signals in multiresolution mode. The wavelet transform is a mathematical theory of formulating a model for signals, systems and a series of processes by using specifically selected signals. These signals are referred to as little waves or wavelets. Recently, the wavelet transform is widely employed in the field of signal and image processing since it has a fast rate as compared with a conventional signal processing algorithm based on the Fourier transform, and it can efficiently accomplish signal localization in time and frequency domains.

On the other hand, the images, which are obtained by extracting only iris patterns from the iris images acquired by image acquisition equipment and normalizing the patterns at a 450×60 size, are used to extract characteristic values through the wavelet transform. Further, a Harr wavelet transform has been widely used in conventional iris recognition, image processing and the like. However, Harr wavelet functions have disadvantages in that the characteristic values are discontinuously and rapidly changed and that high resolution of the images cannot be obtained in a case where the images are again decompressed after they have been compressed. On the contrary, since Daubechies wavelet functions are continuous functions, the disadvantages of the Harr wavelet functions that the values thereof are discontinuously and rapidly changed can be avoided, and the characteristic values can be extracted more accurately and delicately. Therefore, in a case where the images are to be again decompressed after they have been compressed by using the Daubechies wavelet transform, the images can be restored in high resolution nearer to the original images than when the Harr wavelet transform is used. Since the Daubechies wavelet functions are more complicated than the Harr wavelet functions, there is a disadvantage in that more arithmetic quantity may be needed. However, it can be easily overcome by the recent advent of ultrahigh speed microprocessors.

There is also an advantage in that the Daubechies wavelet transform can obtain fine characteristic values in the process of performing the wavelet transform for extracting the characteristic values. That is, if the Daubechies wavelet transform is used, expression of the iris features can be made in a low capacity of data and extraction of the features can be made accurately.

Methods of extracting the characteristic values and forming the characteristic vectors by using Gabor transform been mainly used in the conventional iris recognition field. However, the characteristic vectors generated by these methods are formed to have 256 or more dimensions, and they have at least 256 bytes even though it is assumed that one byte is assigned to one dimension. Thus, there is a problem in that practicability and efficiency can be reduced when it is used in the field where low capacity information is needed. Accordingly, it is necessary to develop a method of forming the low capacity characteristic vectors wherein processing, storage, transfer, search, and the like of the pattern information can be efficiently made. In addition, since a simple method of measuring a distance such as a Hamming distance (HD) between two characteristic vectors (characteristic vectors relevant to the input pattern and stored reference characteristic vectors) is used for pattern classification in a prior art such as U.S. Pat. No. 5,291,560, there are disadvantages in that formation of the reference characteristic vectors through generalization of the pattern information cannot be easily made and information characteristics of each dimension of the characteristic vectors cannot be properly reflected.

That is, in the method of using the Hamming distance in order to verify the two characteristic vectors generated in the form of binary vectors, bit values assigned according to respective dimensions are compared with each other. If they are identical to each other, 0 is given; and if they are different from each other, 1 is given. Then, a value divided by the total number of the dimensions is obtained as a final result. The method is simple and useful in discriminating a degree of similarity between the characteristic vectors consisted of binary codes. When the Hamming distance is used, the comparison result of all the bits becomes 0 if identical data are compared with each other. Thus, the result approaching to 0 implies that the data belong to the persons themselves. If the data do indeed belong to the person, the probability of a degree of similarity will be 0.5. Thus, upon comparison with the other person's data, it is understood that the values converge around 0.5. Accordingly, a proper limit set between 0 and 0.5 will be a boundary for differentiating the data of the persons themselves from the other person's data. The Hamming distance (HD) is excellent in performance thereof in a case where the information is obtained from the extracted iris features by subdividing the data, but it is not suitable when low capacity data is to be used. In other words, in a case where total number of the bits of the characteristic vectors having 256-byte information is 2048, considerably high acceptance rates can be achieved even though the Hamming distance is applied. However, in a case where low capacity characteristic vectors in which the number of characteristic vectors is reduced are used as in the present invention, high acceptance rates cannot be obtained.

On the other hand, in a case where the low capacity characteristic vectors are used, improvement of the acceptance rate is limited to a certain extent since lost information is increased. Thus, a method of preventing loss of the information while maintaining minimum capacity of the characteristic vectors should be considered in the process of generating the characteristic vectors.

SUMMARY OF THE INVENTION

One aspect of the present invention is to provides a method of processing an iris image data. The method comprises: providing data representing an image of an iris of an eye; performing a Daubechies wavelet transform on the iris image data, thereby dividing the iris image data into multiple data segments; repeating the Daubechies wavelet transform a predetermined number of times on one of the data segments divided in the immediately previous transform, thereby dividing the data segment on which the transform is performed into smaller data segments, wherein the data segment on which the transform is performed represents more information on iris patterns than the other data segments divided in the immediately previous transform; and forming a characteristic vector of the iris image comprising information of at least one data segment divided in each Daubechies wavelet transform. In the method, the data segment representing more information on iris pattern than the other segments divided in the immediately previous transform comprise more low frequency components than the other segments. Each of the data segments produced in each Daubechies wavelet transform is classified based on frequency components of the data. Each of the data segments produced in each Daubechies wavelet transform is classified based on frequency components of the data in two perpendicular directions on an image each data represents.

In the above-described method, the data segments produced in each Daubechies wavelet transform is classified one of HH, HL, LH and LL, wherein HH represents high frequency components in a first direction and a second direction on an image each data represents, the first and second directions being perpendicular to each other, wherein HL represents a high frequency component in the first direction and a low frequency component in the second direction, wherein LH represents a low frequency component in the first direction and a high frequency component in the second direction, and wherein LL represents low frequency components in the first and second directions. The characteristic vector comprises information of a data segment characterized as HH divided in each of the Daubechies wavelet transform. The information of the HH data segment comprises an average value of data of the segment representing the image thereof. The characteristic vector comprises information of a data segment characterized as LL divided in the last Daubechies wavelet transform. The information of the LL data segment comprises a substantial portion of the data of the segment representing the image thereof. The information of the LL data segment comprises all of the data of the segment representing the image thereof. A total number of the Daubechies wavelet transform is N, the characteristic vector comprises an N−1 number of values of HH data segments. The method further comprises quantitizing values of the characteristic vector. The predetermined number of repetitions is set such that a total number of the Daubechies wavelet transform is from 2 to 7. The predetermined number of repetitions is set such that a total number of the Daubechies wavelet transform is from 4. The method further comprises registering the characteristic vector with or without further processing.

Another aspect of the present invention provides a device for use in processing iris image data. The method comprises: means for providing data representing an image of an iris of an eye; means for performing a Daubechies wavelet transform on the iris image data, thereby dividing the iris image data into multiple data segments, wherein the means for performing the transform is configured to repeat the Daubechies wavelet transform a predetermined number of times on one of the data segments divided in the immediately previous transform, thereby dividing the data segment on which the transform is performed into smaller data segments, and wherein the data segment on which the transform is performed represents more information on iris patterns than the other data segments divided in the immediately previous transform; and means for forming a characteristic vector of the iris image comprising information of at least one data segment divided in each Daubechies wavelet transform. The method further comprises processing the characteristic vector to determine whether the iris image matches a pre-registered iris image. The characteristic vector is processed together with a characteristic vector of the pre-registered iris image to produce an inner product of the characteristic vectors. The iris image is determined to match the pre-registered iris image when an inner product of the characteristic vector and a characteristic vector of the pre-registered iris image is greater than a predetermined threshold value.

Another aspect of the present invention provides a device for processing iris image data. The device comprises: an input device configured to receive data representing an image of an iris of an eye; a first circuit configured to perform a Daubechies wavelet transform on the iris image data a predetermined number of times; and a second circuit configured to form a characteristic vector of the iris image based on the Daubechies wavelet transform.

Still another aspect of the present invention provides a device for identifying an iris pattern. The method comprises: means for obtaining a characteristic vector from an iris image in accordance with the above-described method of processing an iris image data; and means for processing the characteristic vector to determine whether the iris image matches a pre-registered iris image.

Still another aspect of the present invention provides a security system. The system comprises: the above-described iris image data processing device; and a third circuit configured to process the characteristic vector to determine whether the iris image matches a pre-registered iris image.

SUMMARY OF INVENTION

Therefore, the present invention is contemplated to solve these problems mentioned above. An object of the present invention is to provide a method of forming low capacity characteristic vectors wherein a false acceptance rate FAR) and a false rejection rate (FRR) can be remarkably reduced, as compared with a conventional Harr wavelet transform, by extracting iris features from inputted iris image signals through a Daubechies wavelet transform.

Another object of the present invention is to provide a method of measuring the similarity between characteristic vectors, wherein loss of information produced when low capacity characteristic vectors are formed can be minimized and the low capacity characteristic vectors can be properly used for the similarity measurement.

In order to achieve the above objects of the present invention, there is provided a method of recognizing the human iris using the Daubechies wavelet transform, wherein preprocessing for extracting only an iris image from an eye image of a user acquired by image acquisition equipment using a halogen lamp illuminator is performed and identification of the user is determined by the preprocessed iris image comprising (a) repeatedly performing the Daubechies wavelet transform of the preprocessed iris image at predetermined times so as to multi-divide the iris image, and extracting an image including high frequency components from the multi-dvided image so as to extract iris features; (b) extracting characteristic values of a characteristic vector from the extracted image including the high frequency components, and generating a binary characteristic vector by quantizing relevant characteristic values; and (c) determining the user as an enrollee by measuring similarity between the generated characteristic vector and a previously registered characteristic vector.

The present invention will be briefly described below. The iris image is acquired through the image acquisition equipment in which the halogen lamp illuminator is used. By repeatedly performing the Daubechies wavelet transform of the inputted iris image, the iris image is multi-divided and iris features having optimized sizes thereof are extracted. The characteristic vector, which is effective in displaying and processing the image, is then formed by quantizing the extracted characteristic values. Since the Daubechies wavelet transform is used as a wavelet transform, more accurate characteristic values can be extracted while maintaining maximum advantage of the wavelet. Furthermore, in a case where the dimension of the characteristic vector is reduced by quantizing the extracted characteristic values into binary values, that is, when a low capacity characteristic vector is formed, a method of measuring similarity between the weighted registered and inputted characteristic vectors is properly used to prevent reduction of acceptance resulting from the formation of the low capacity characteristic vector. The user authenticity is therefore determined by the foregoing method.

BRIEF DESCRIPTION OF THE DRAWINGS

FIG. 6a shows a distribution example of characteristic values of the extracted iris image.

FIG. 6b shows a quantization function for generating binary characteristic vector from the distribution example of FIG. 6a.

DETAILED DESCRIPTION FOR PREFERRED EMBODIMENT

Hereinafter, a method of recognizing a human iris using a Daubechies wavelet transform according to the present invention will be explained in detail with reference to the accompanying drawings.

Figure 1:
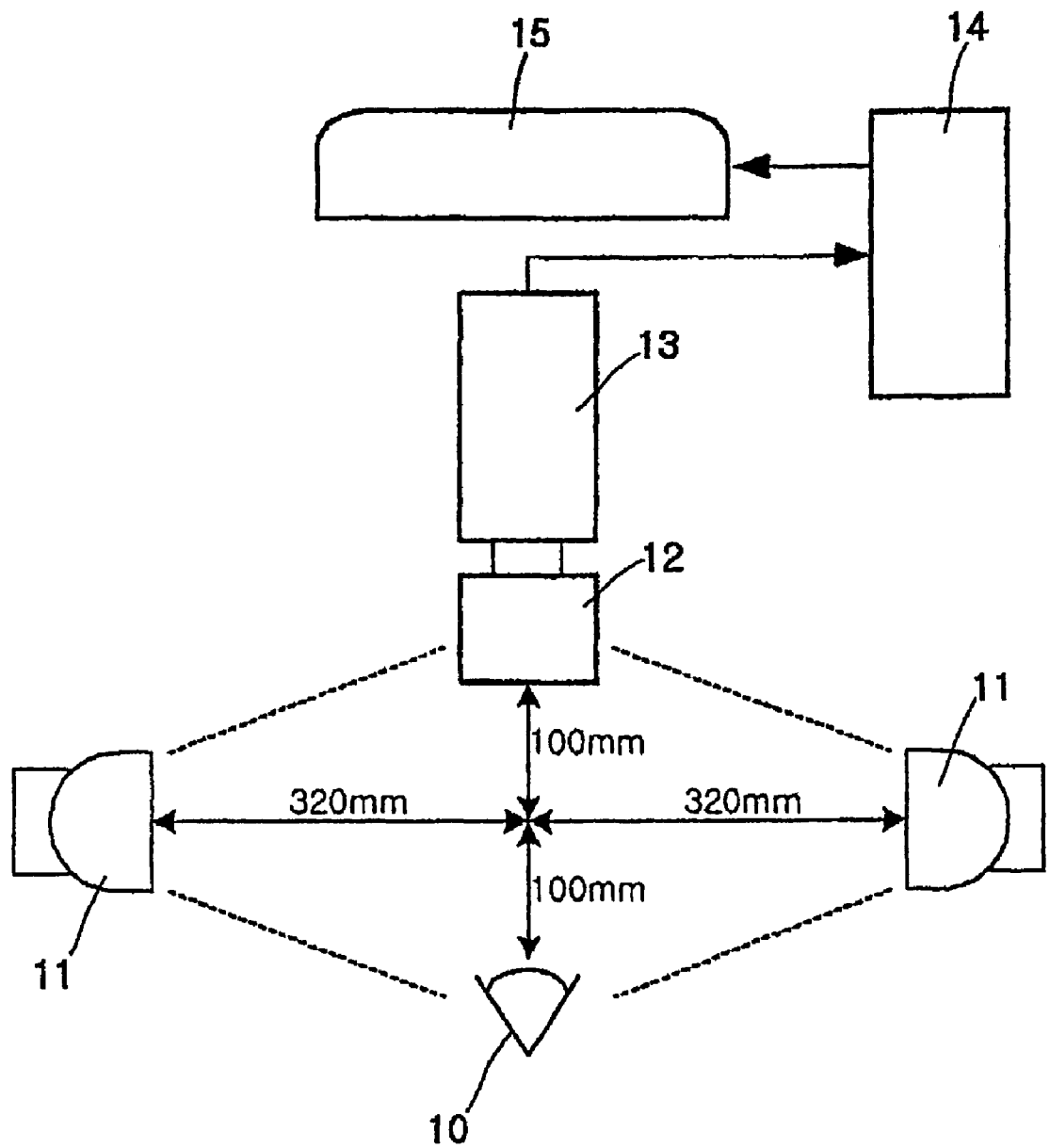
FIG. 1 is a view showing the constitution of image acquisition equipment used for performing an iris recognition method according to the present invention.

FIG. 1 shows the constitution of image acquisition equipment for use in a method of recognizing a human iris according to the present invention. Referring to FIG. 1, the constitution of the iris image acquisition equipment will be explained. The image acquisition equipment for use in the method of recognizing the human iris according to the present invention comprises a halogen lamp 11 for illuminating the iris in order to acquire clear iris patterns, a CCD camera 13 for photographing an eye 10 of a user through a lens 12, a frame grabber 14 connected to the CCD camera 12 for acquiring an iris image, and a monitor 15 for showing the image, which are currently inputted to the camera, to the user so that acquisition of correct images and positioning convenience of the user can be obtained when images are acquired.

According to the constitution of the image acquisition equipment, the CCD camera is used to acquire the image, and iris recognition is made through a pattern analysis of iridial folds. However, in a case where the iris image is acquired indoors by using an ordinary illuminator, it is difficult to extract desired pattern information since the iris image is generally gloomy. Additional illuminators should therefore be used so that the information on the iris image cannot be lost. In such a case, loss of the iris pattern information and deterioration of recognition capability due to reflective light should be prevented, and proper illuminators should be utilized so that a clear iris pattern can be obtained. In the present invention, the halogen lamp 11 having strong floodlighting effects is used as a main illuminator so that the iris pattern can be clearly shown. Further, as shown in FIG. 1, the loss of the iris image information and eye fatigue of the user can be avoided by placing the halogen lamp illuminators on the left and right sides of the eye in order to cause the reflective light from the lamp to be formed on outer portions of the iris region.

Figure 2:
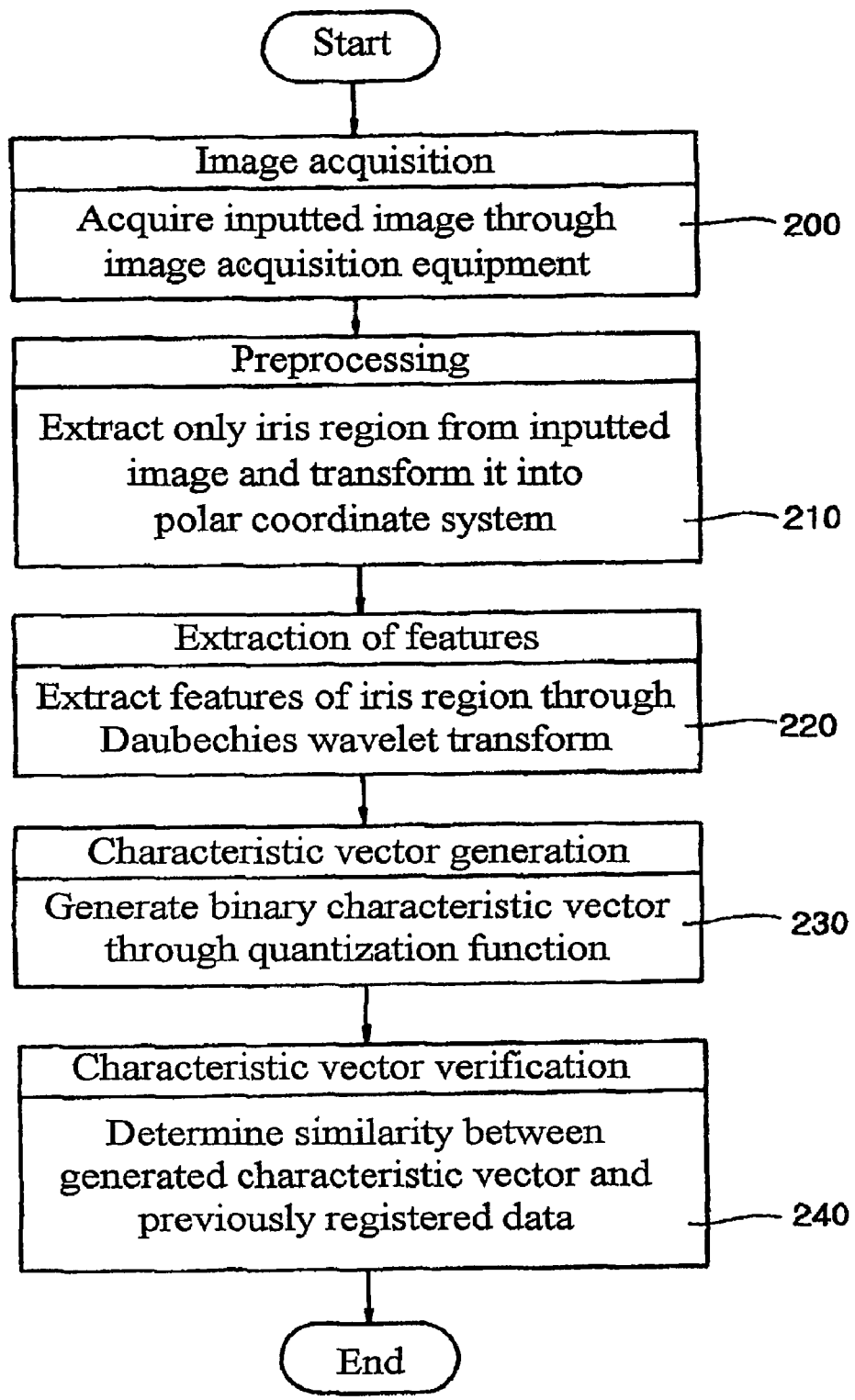
FIG. 2 is a flowchart showing procedures for verifying an iris image according to the present invention.

FIG. 2 is a flowchart showing procedures for verifying the iris image according to the present invention. Referring to FIG. 2, an eye image is acquired through the image acquisition equipment as mentioned above in step 200. In step 210, images of the iris regions are extracted from the acquired eye image-through pre-processing and transformed into a polar coordinate system, and the transformed iris pattern is inputted to a module for extracting the features. In step 220, the Daubechies wavelet transform of the inputted iris pattern transformed into the polar coordinate system is performed, and the features of the iris regions are then extracted. The extracted features have real numbers. In step 230, a binary characteristic vector is generated by applying K-level quantization function to the extracted features. In step 240, similarity between the generated characteristic vector and previously registered data of the user is measured. Through the similarity measurement, user authenticity is determined and then verification results are shown.

In a case where the features of the iris regions are extracted by performing the Daubechies wavelet transform as described above, the Daubechies wavelet function having eight, sixteen or more coefficients can extract more delicate characteristic values than the Daubechies wavelet function having four coefficients, even though the former is more complicate than the latter. Although the Daubechies wavelet function having eight or more coefficients has been used and tested in the present invention, greater performance improvement was not obtained from the present invention and arithmetic quantity and processing time are increased, as compared with a case where the Daubechies wavelet function having four coefficients has been used and tested. Thus, the Daubechies wavelet function having four coefficients has been used for extracting the characteristic values.

Figure 3:
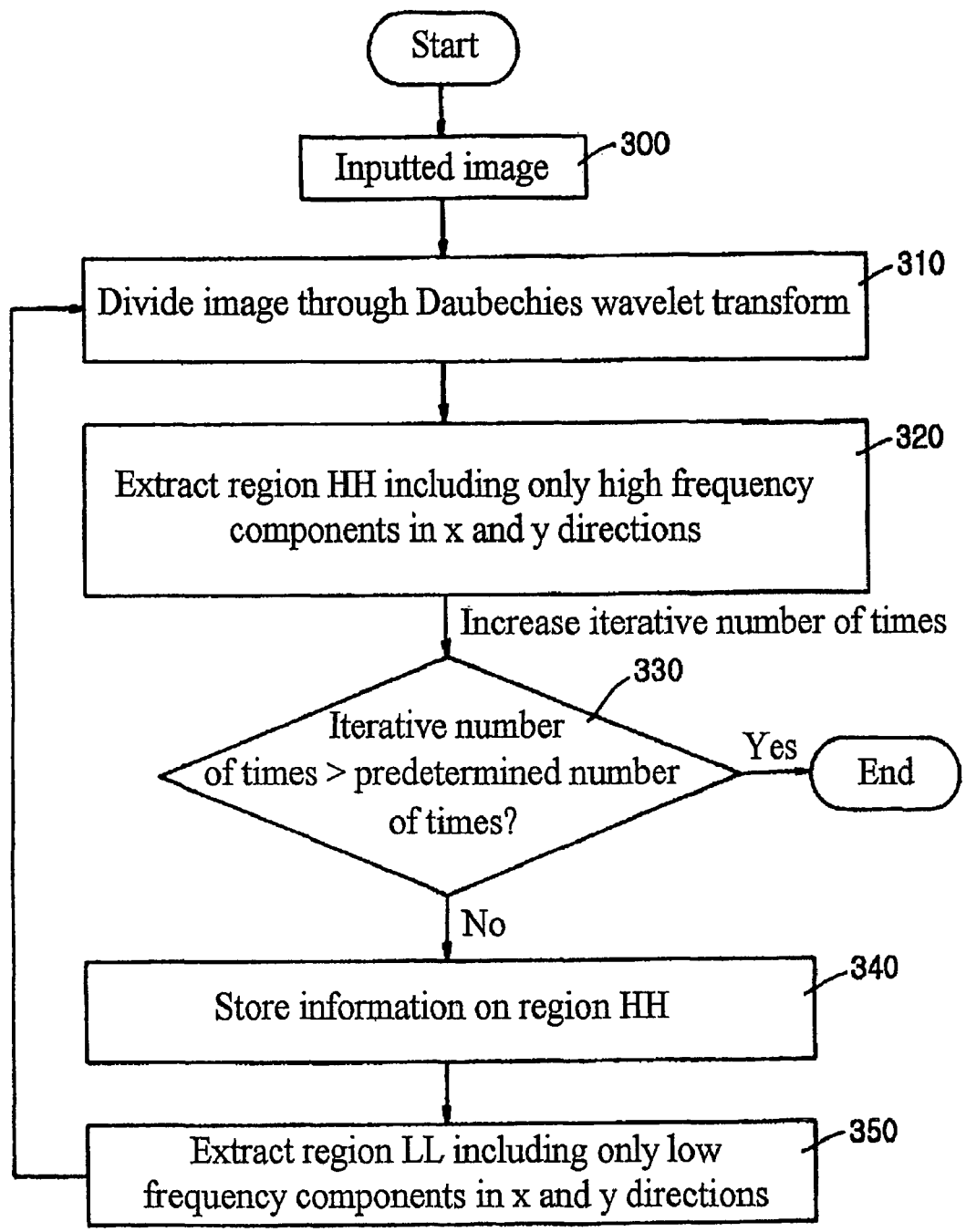
FIG. 3 is a flowchart showing procedures for multi-dividing the iris image through Daubechies wavelet transform according to the present invention.
Figure 4:
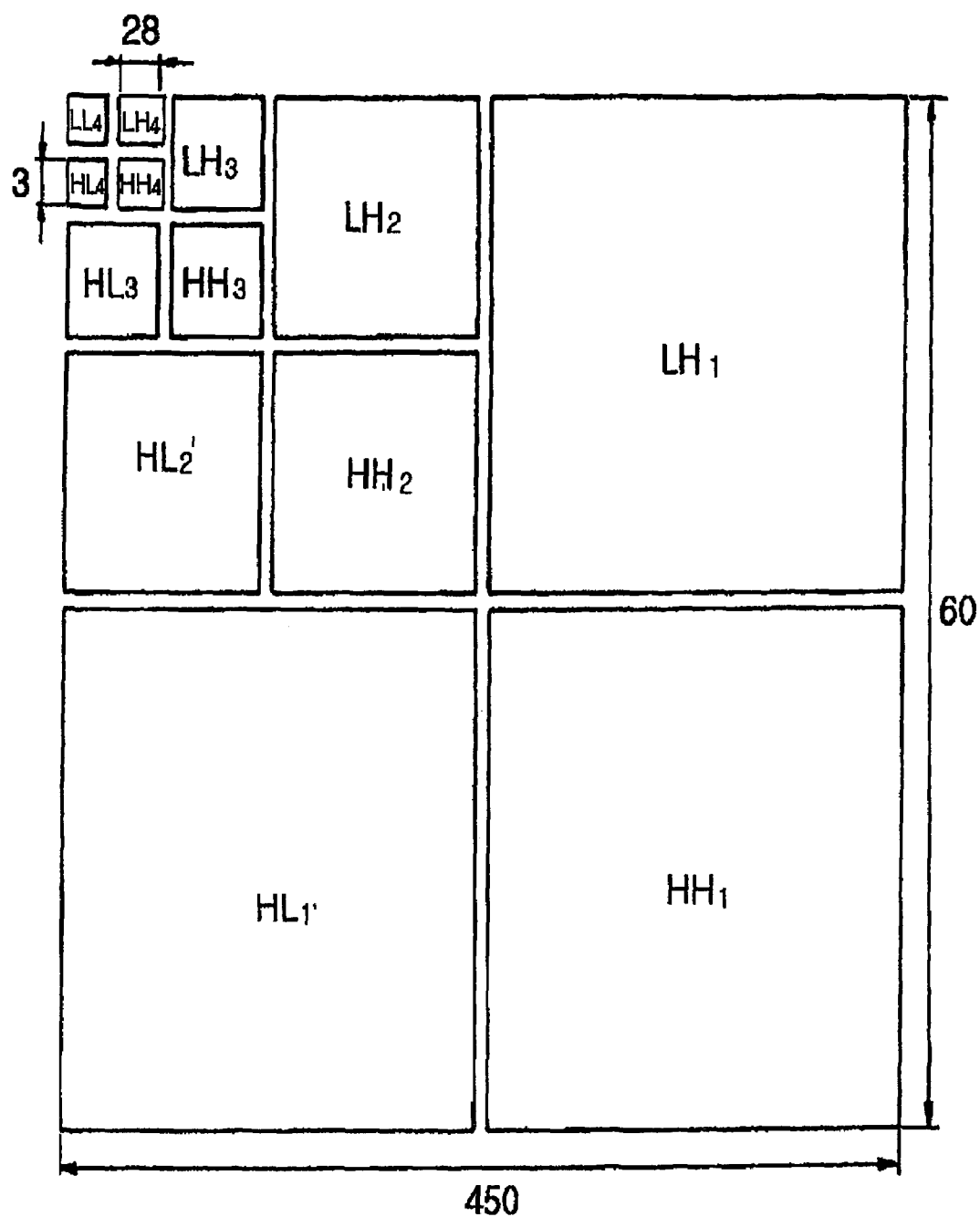
FIG. 4 shows an example of multi-dividing the iris image through the Daubechies wavelet transform.

FIG. 3 is a flowchart showing procedures for multi-dividing the iris image by performing the Daubechies wavelet transform according to the present invention, and FIG. 4 shows an image divided through the Daubechies wavelet transform. Referring to FIGS. 3 and 4, in the present invention, the Daubechies wavelets among various mother wavelets are used to perform extraction of the iris image characteristics. As shown in FIG. 4, when "L" and "H" are respectively used to indicated low frequency and high frequency components, the term "LL" means a component that has passed through a low-pass filter (LPF) in all x and y directions whereas a term "HH" means a component that has passed through a high-pass filter (HPF) in the x and y directions. Furthermore, subscript numerals signify image-dividing stages. For example, "$LH_2$" means that the image has passed through the low-pass filter in the x direction and through the high-pass filter in the y direction during 2-stage wavelet division.

In step 310, the inputted iris image is multi-divided by using the Daubechies wavelet transform. Since the iris image is considered as a two-dimensional signal in which one-dimensional signals are arrayed in the x and y directions, quarterly divided components of one image should be extracted by passing through the LPF and HPF in all x and y directions in order to analyze the iris image. That is, one two-dimensional image signal is wavelet-transformed in vertical and horizontal directions, and the image is divided into four regions LL, LH, HL, and HH after the wavelet transform has been performed once. At this time, through the Daubechies wavelet transform, the signal is divided into a differential component thereof that has passed through the high-pass filter, and an average component that has passed through the low-pass filter Alternatively, performance of the iris recognition system is evaluated in view of two factors; a false acceptance rate (FAR) and a false rejection rate (FRR). Here, the FAR means a probability that entrance of unregistered persons (imposters) may be accepted due to false recognition of unregistered persons as registered ones, and the FRR means a probability that entrance of registered persons (enrollees) is rejected due to false recognition of the registered persons as unregistered ones. For reference, when the method of recognizing the human iris using the Daubechies wavelet transform according to the present invention is employed, the FAR has been reduced from 5.5% to 3.07% and the FRR has also been reduced from 5.0% to 2.25%, as compared with the method of recognizing the human iris using the conventional Harr wavelet transform.

In step 320, a region HH including only high frequency components in the x and y directions is extracted from the divided iris image.

In step 330, after increasing the iterative number of times of dividing the iris image, the processing step is completed when the iterative number is greater than a predetermined number. Alternatively, if the iterative number is lower than the predetermined number, the information on the region HH is stored as information for extracting the iris features in step 340.

Further, in step 350, a region LL comprising only low frequency components in the x and y directions is extracted from the multi-divided iris image. Since the extracted region LL (corresponding to the image reduced in a fourth size as compared with the previous image) includes major information on the iris image, it is provided as an image to be newly processed so that the wavelet transform can be again applied to the relevant region. Thereafter, the Daubechies wavelet transform is repeatedly performed from step 310.

On the other hand, in a case where the iris image is transformed from the Cartesian coordinate system to polar coordinate system, in order to avoid changes in the iris features according to variations in the size of the pupil, the region between the inner and outer boundaries of the iris is divided into 60 segments in the r direction and 450 segments in the θ direction by varying the angles by 0.8 degrees. Finally, the information on the iris image is acquired and normalized as 450×60 (θ×r) data. Then, if the acquired iris image is once again wavelet-transformed, the characteristics of the 225×30 region $HH_1$ of which size is reduced by half are obtained, namely, the 225×30 information is used as a characteristic vector. This information may be used as it is, but a process of dividing the signals is repeatedly performed in order to reduce the information size. Since the region LL includes major information on the iris image, the characteristic values of further reduced regions such as $HH_2$, $HH_3$ and $HH_4$ are obtained by successively applying the wavelet transform to respective relevant regions.

Figure 5:
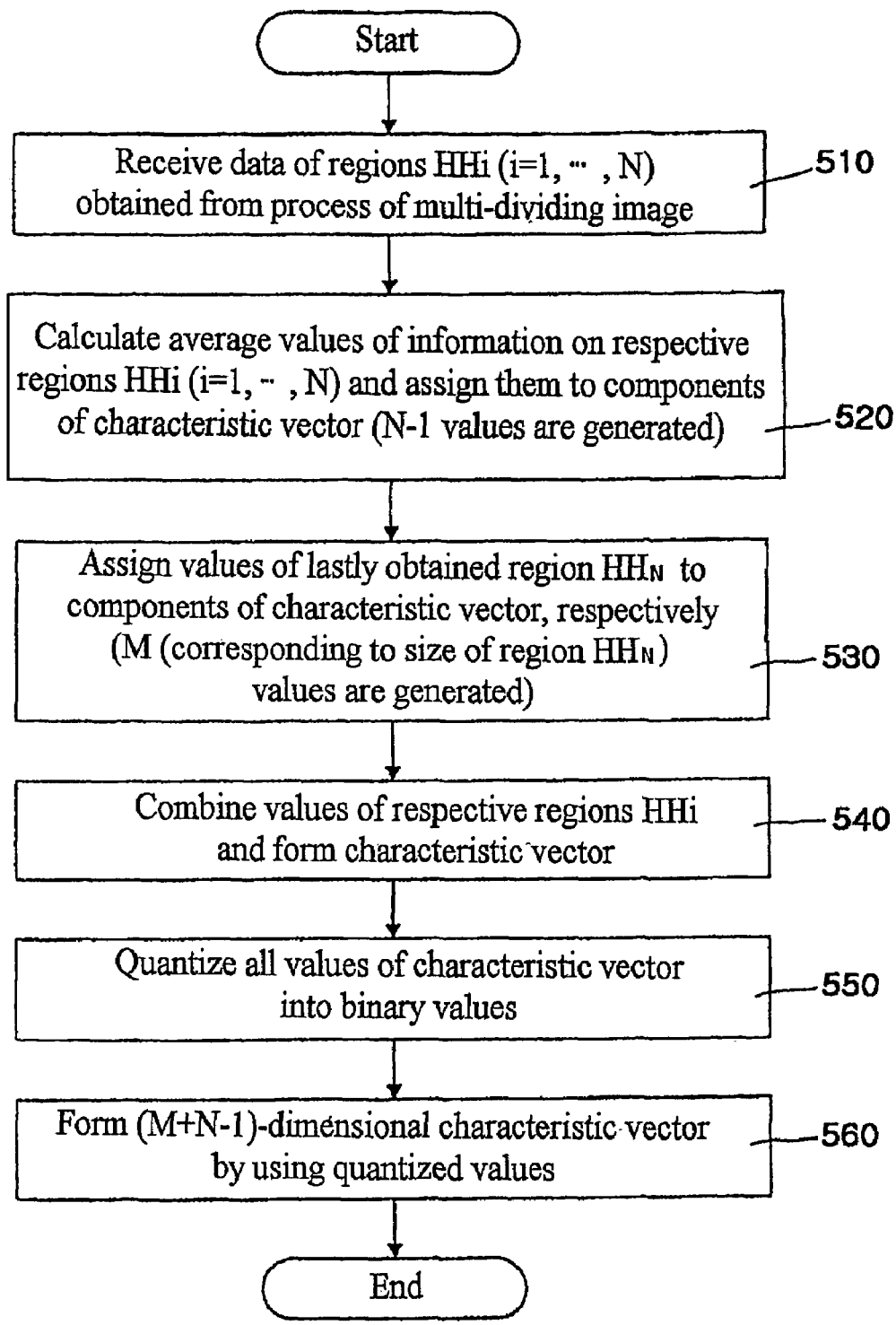
FIG. 5 is a flowchart showing procedures for forming a characteristic vector of the iris image based on data acquired from the procedures of multi-dividing the iris image according to the present invention.

The iterative number, which is provided as a discriminating criterion for repeatedly performing the wavelet transform, should be set as a proper value in consideration of loss of the information and size of the characteristic vector. Therefore, in the present invention, the region $HH_4$ obtained by performing the wavelet transform four times becomes a major characteristic region, and values thereof are selected as components of the characteristic vector. At this time, the region $HH_4$ contains the information having 84 (=28×3) data FIG. 5 is a flowchart showing procedures for forming the characteristic vector of the iris image by using the data acquired from the process of multi-dividing the iris image according to the present invention. Referring to FIG. 5, the information on the n characteristic vector extracted from the above process, i.e., the information on the regions $HH_1$, $HH_2$, $HH_3$, and $HH_4$ is inputted in step 510. In step 520, in order to acquire the characteristic information on the regions $HH_1$, $HH_2$ and $HH_3$ excluding the information on the region $HH_4$ obtained through the last wavelet transform among the n characteristic vector, each average value of the regions $HH_1$, $HH_2$ and $HH_3$ is calculated and assigned one dimension. In step 530, all the values of the final obtained region $HH_4$ are extracted as the characteristic values thereof. After extraction of the characteristics of the iris image signals has been completed, the characteristic vector is generated based on these characteristics. A module for generating the characteristic vector mainly performs the processes of extracting the characteristic values in the form of real numbers and then transforming them to binary codes consisting of 0 and 1.

However, in step 540, the N−1 characteristic values extracted from step 520 and the M (the size of the final obtained region HH) characteristic values extracted from step 530 are combined and (M+N−1)-dimensional characteristic vector is generated. That is, the total 87 data, which the 84 data of the region $HH_4$ and the 3 average data of the regions $HH_1$, $HH_2$ and $HH_3$ are combined, are used as a characteristic vector in the present invention.

In step 550, the values of the previously obtained characteristic vector, i.e., respective component values of the characteristic vector expressed in the form of the real numbers are quantized into binary values 0 or 1. In step 560, the resultant (M+N−1)-bit characteristic vector is generated by the quantized values. That is, according to the present invention, the resultant 87-bit characteristic vector is generated.

Figure 6:
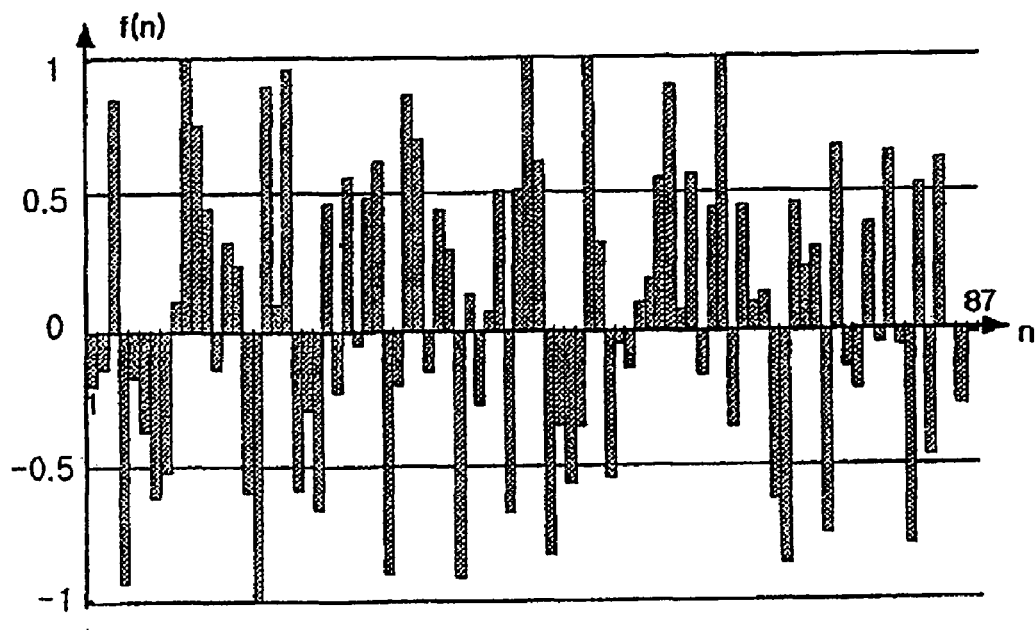
Figure 6:
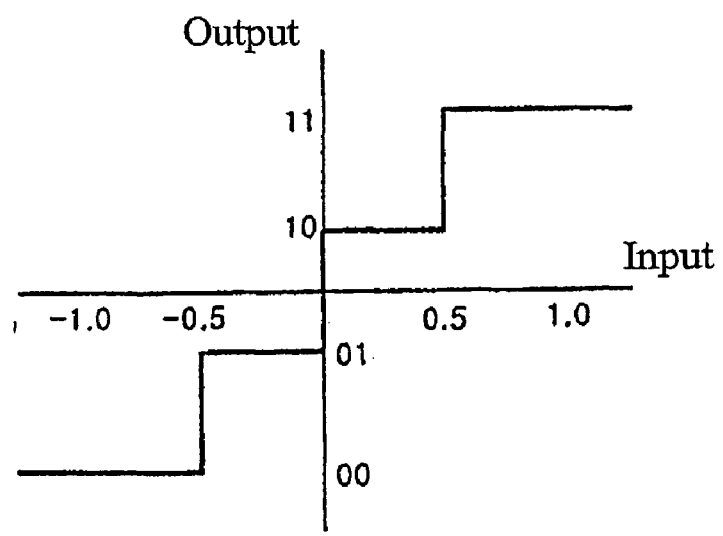

FIG. 6a shows a distribution example of the characteristic values of the extracted iris image. When the values of the 87-dimensional characteristic vector are distributed according to respective dimensions, the distribution roughly takes a shape of FIG. 6a. The binary vector including all the dimensions is generated by the following Equation 1.

$f_n=0$ if $f(n)<0$ $f_n=1$ if $f(n)>0$ [Equation 1]

where f(n) is a characteristic value of the n-th dimension and $f_n$ is a value of the n-th characteristic vector.

When the 87-bit characteristic vector that is obtained by assigning one bit to the total 87 dimensions are generated in order to use a low capacity characteristic vector, improvement of the recognition rate is limited to some extent since loss of the information on the iris image is increased. Therefore, when generating the characteristic vector, it is necessary to prevent information loss while maintaining the minimum capacity of the characteristic vector.

FIG. 6b shows a quantization function for generating a binary characteristic vector from the distribution example of the characteristic values shown in FIG. 6a The extracted (M+N−1)-dimensional characteristic vector shown in FIG. 6a is evenly distributed mostly between 1 and −1 in view of its magnitude. Then, the binary vector is generated by applying the K-level quantization function shown in FIG. 6a to the characteristic vector. Since only signs of the characteristic values are obtained through the process of Equation 1, it is understood, that information on the magnitude has been discarded. Thus, in order to accept the magnitude of the characteristic vector, a 4-level quantization process was utilized in the present invention.

As described above, in order to efficiently compare the characteristic vector generated through the 4-level quantization with the registered characteristic vector, the quantization levels have the weights expressed in the following Equation 2.

$f_n=4$ if $f(n) \geq 0.5$ (level 4)

$f_n=1$ if $0.5 > f(n) \geq 0$ (level 3)

$f_n=-1$ if $0 > f(n) > -0.5$ (level 2)

$f_n=-4$ if $f(n) < -0.5$ (level 1) [Equation 2]

where $f_n$ means an n-th dimension of the previously registered characteristic vector $f_R$ of the user or the characteristic vector $f_T$ of the user generated from the iris image of the eye image of the user. Explanation of how to use the weights expressed in Equation 2, is as follows.

In a case where the n-th dimensional characteristic value f(n) is equal or more than 0.5 (level 4), the value of the i-th dimension $f_{Ri}$ or $f_{Ti}$ is converted and assigned 4 if the value is "11". In a case where the n-th dimensional characteristic value f(n) is more than 0 and, less than 0.5 (level 3), the value of the i-th dimension $f_{Ri}$ or $f_{Ti}$ is converted and assigned 1 if the value is "10". In a case where the n-th dimensional characteristic value f(n) is more than −0.5 and less than 0 (level 2), the value of the i-th dimension $f_{Ri}$ or $f_{Ti}$, is converted and assigned −1 if the value is "01". In a case where the n-th dimensional characteristic value f(n) is equal or less than −0.5 (level 1), the value of the i-th dimension $f_{Ri}$ or $f_{Ti}$, is converted and assigned −4 if the value is "00". This is due to the weights being applied to respective values as expressed in Equation 2 as it is suitable for the following verification method of the present invention.

Figure 7:
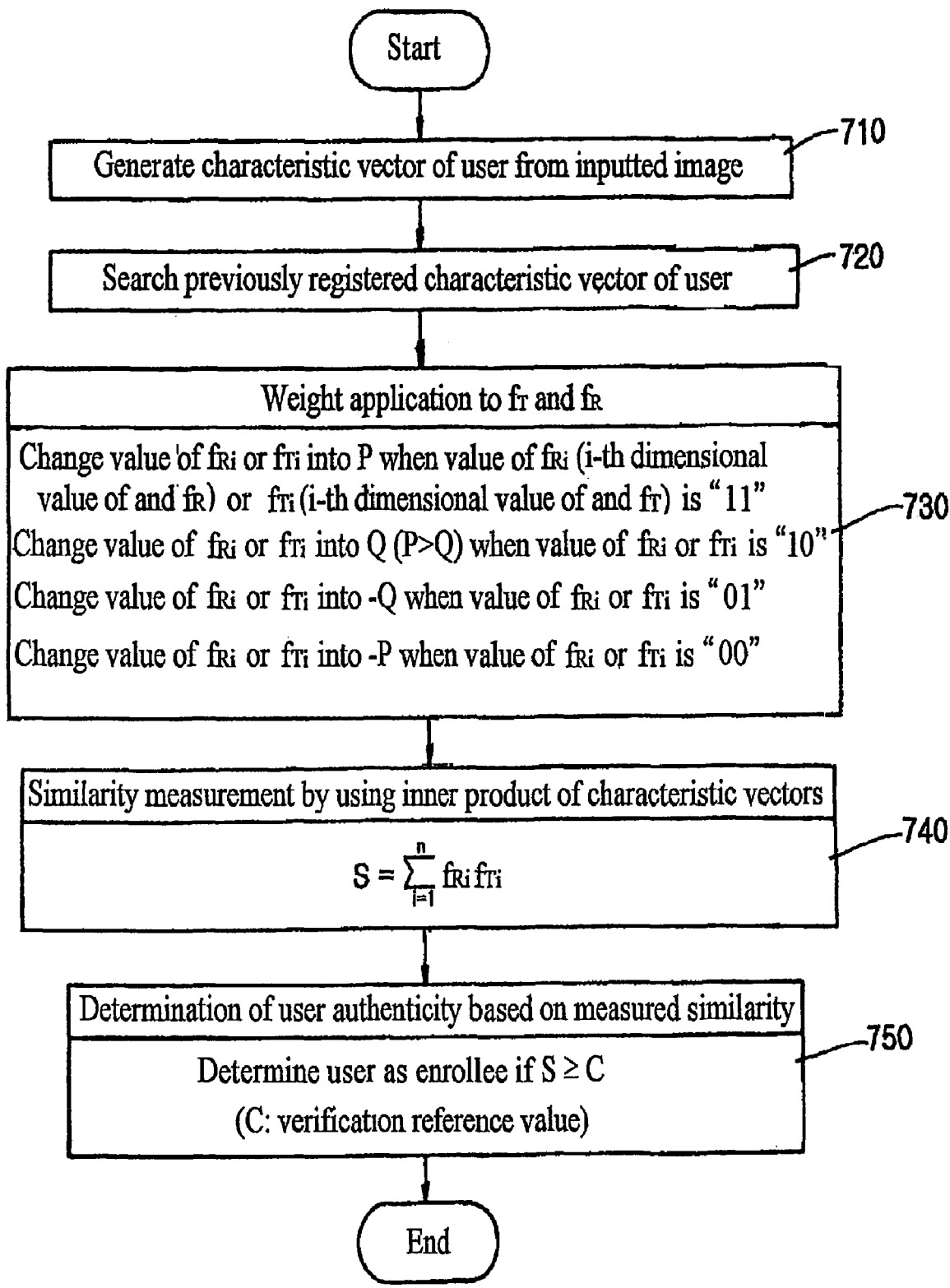
FIG. 7 is a flowchart showing procedures for determining user authenticity through a similarity measurement between the characteristic vectors.

FIG. 7 is a flowchart showing procedures for discriminating the user authenticity through similarity measurement between the characteristic vectors. Referring to FIG. 7, in step 710, the characteristic vector $f_T$ of the user is generated from the iris image of the eye image of the user. In step 720, the previously registered characteristic vector $f_R$ of the user is searched. In step 730, in order to measure the similarity between the two characteristic vectors, the weights are assigned to the characteristic vectors $f_R$ and $f_T$ depending on the value of the binary characteristic vector based on Equation 2.

In step 740, an inner product or scalar product S of the two characteristic vectors is calculated and the similarity is finally measured. Among the measures generally used for determining correlation between the registered characteristic vector $f_R$ and the characteristic vector $f_T$ of the user, it is the inner product S of the two characteristic vectors which indicate the most direct association. That is, after the weights have been assigned to the respective data of the characteristic vector in step 730, the inner product S of the two characteristic vectors is used to measure the similarity between the two vectors.

The following Equation 3 is used for calculating the inner product of the two characteristic vectors.

$$S = \sum_{i=1}^{n} f_{Ri} f_{Ti} = (f_{R1} f_{T1} + f_{R2} f_{T2} + \ldots + f_{Rn} f_{Tn})$$ [Equation 3]

where $f_R$ is the characteristic vector of the user that has been already registered, and $f_T$ is the characteristic vector of the user that is generated from the iris image of the eye of the user.

According to the above processes, one effect which can be obtained by the quantization according to the sign of the characteristic vector values as in the method in which the binary vector is generated with respect to the values of the characteristic vector extracted from the iris image according to respective dimensions can be maintained. That is, like the Harming distance, the difference between 0 and 1 can be expressed. In a case where the two characteristic vectors have the same-signed values with respect to the each dimension, positive values are added to the inner product S of the two characteristic vectors. Otherwise, negative values are added to the inner product S of the two vectors. Consequently, the inner product S of the two characteristic vectors increases if the two data belong to an identical person, while the inner product S of the two characteristic vectors decreases if the two data does not belong to an identical person.

In step 750, the user authenticity is determined according to the measured similarity obtained from the, inner product S of the two characteristic vectors. At this time, the determination of the user authenticity based on the measured similarity depends on the following Equation 4.

If S>C, then TRUE or else FALSE [Equation 4]

where C is a reference value for verifying the similarity between the two characteristic vectors.

That is, if the inner product S of the two characteristic vectors is equal or more than the verification reference value C, the user is determined as an enrollee. Otherwise, the user is determined as an imposter.

As described above, the method of recognizing the human iris using the Daubechies wavelet transform according to the present invention has an advantage that FAR and FRR can be remarkably reduced as compared with the method using the conventional Harr wavelet transform, since the iris features are extracted from the inputted iris image signals through the Daubechies wavelet transform.

Furthermore, in order to verify the similarity between the registered and extracted characteristic vectors $f_R$ and $f_T$, the inner product S of the two characteristic vectors is calculated, and the user authenticity is determined based on the measured similarity obtained by the calculated inner product S of the two vectors. Therefore, there is provided a method of measuring the similarity between the characteristic vectors wherein loss of the information, which may be produced by forming the low capacity characteristic vectors, can be minimized.

The foregoing is a mere embodiment for embodying the method of recognizing the human iris using the Daubechies wavelet transform according to the present invention. The present invention is not limited to the embodiment described above. A person skilled in the art can make various modifications and changes to the present invention without departing from the technical spirit and scope of the present invention defined by the appended claims.

What is claimed is:

1. A method of processing iris image data, comprising:
   providing data representing an image of an iris of an eye;
   performing a Daubechies wavelet transform on the iris image data so as to create multiple pieces of transformed image data;
   selecting one from the multiple pieces of transformed image data;
   repeating to perform the Daubechies wavelet transform on a piece of image data so as to create additional multiple pieces of transformed image data and subsequently to select one from the additional multiple piece of the transformed image data, wherein the piece of image data on which the Daubechies wavelet transform is repeated is the selected piece that is selected in the immediately previous selecting step, wherein performing the Daubechies wavelet transform and subsequently selecting are repeated at least once;
   upon completion of the repeating step, forming a characteristic vector of the iris image of the eye, wherein the characteristic vector comprises quantatized pixel values of the selected piece of transformed image data that is selected in the last selecting of the repeating step, wherein the quantitized pixel values comprise at least two positive values and at least two negative values;
   providing a reference characteristic vector of a registered iris image;
   computing an inner product of the reference characteristic vector and the characteristic vector of the iris image of the eye;
   determining whether the iris image of the eye matches with the registered iris image based on a value of the inner product.

2. The method of claim 1, wherein the quantitized pixel values comprise one of the at least two positive values has the same absolute value as one of the at least two negative values.

3. The method of claim 1, wherein the quantitized pixel values comprise a first positive value and a second positive value, wherein the second positive value is greater than two times of the first positive value.

4. The method of claim 1, wherein each piece of transformed image data comprise a lesser amount of data than the image data prior to performing the Daubechies wavelet transform.

5. The method of claim 1, wherein the iris image is determined to match the registered iris image when the inner product is greater than a predetermined threshold value.

6. The method of claim 1, wherein the selected piece of transformed image data which is selected in each selection step represents more information on iris patterns than the other pieces of transformed image data created in the Daubechies wavelet transform which is performed immediately prior to each selection step.

7. The method of claim 5, the selected piece of transformed image data which is selected in each selection step comprises more low frequency components than the other pieces of transformed image data created in the Daubechies wavelet transform which is performed immediately prior to each selection step.

8. The method of claim 1, wherein each of the multiple pieces of transformed image data created in each Daubechies wavelet transform is classified based on frequency components of the data.

9. The method of claim 1, wherein each of the multiple pieces of transformed image data created in each Daubechies wavelet transform is classified based on frequency components of each piece of the transformed image data in two perpendicular directions.

10. The method of claim 1, wherein each of the multiple pieces of transformed image data created in each Daubechies wavelet transform is classified one of HH, HL, LH and LL, wherein HH represents high frequency components in a first direction and a second direction, the first and second directions being perpendicular to each other, wherein HL represents a high frequency component in the first direction and a low frequency component in the second, direction, wherein LH represents a low frequency component in the first direction and a high frequency component in the second direction, and wherein LL represents low frequency components in the first and second directions.

11. The method of claim 9, wherein the characteristic vector comprises information of at least one piece of the transformed image data which are classified as HH.

12. The method of claim 10, wherein the information of the HH comprises an average value of the piece of transformed image data classified as HH.

13. The method of claim 9, wherein the characteristic vector comprises information of the selected piece that is selected in the lasts selecting of the repeating step is classified as LL.

14. The method of claim 13, wherein the information of the LL comprises a substantial portion of the transformed image data of the last selected data piece.

15. The method of claim 12, wherein the information of the LL comprises all of the transformed image data of the last selected data piece.

16. The method of claim 12, wherein a total number of the Daubechies wavelet transform is N, wherein the characteristic vector comprises an N−1 number of values of the HH data pieces.

17. The method of claim 1, wherein the number of repetitions is set such that the total number of the Daubechies wavelet transform is from 2 to 7.

18. The method of claim 1, wherein the number of repetitions is set such that the total number of the Daubechies wavelet transform is from 4.

19. A device for use in processing iris image data, comprising:
   means for providing data representing an image of an iris of an eye;
   means for performing a Daubechies wavelet transform on the iris image data, thereby creating multiple pieces of transformed image data, wherein the means for performing the transform is configured to repeat the Daubechies wavelet transform on one of the multiple pieces of transformed image data created in the immediately previous transform;
   means for forming a characteristic vector of one piece of transformed image data;
   a database comprising a reference characteristic vector of a registered iris image;
   means for computing an inner product of the reference characteristic vector and the characteristic vector of the iris image of the eye from the means for forming; and
   means for determining whether the iris image of the eye matches with the registered iris image based on the inner product.

20. A security system comprising:
   an input device configured to receive data representing an image of an iris of an eye;
   a first circuit configured to perform a Daubechies wavelet transform on the iris image data and further configured to repeat the Daubechies wavelet transform on a subset of the transformed iris image data a predetermined number of times so as to generate a further subset of transformed image data;
   a second circuit configured to form a characteristic vector of the iris image comprises information of the further subset of transformed image data from the first circuit;
   a memory configured to store a reference characteristic vector of a registered iris image;
   a third circuit configured to compute an inner product of the reference characteristic vector and the characteristic vector from the second circuit so as to determine whether the iris image matches a pre-registered iris image.

* * * * *